United States Patent
Schultz et al.

(10) Patent No.: US 11,389,729 B2
(45) Date of Patent: Jul. 19, 2022

(54) PREDICTIVE INSTANT PLAY FOR AN APPLICATION OVER THE CLOUD

(71) Applicant: Sony Interactive Entertainment LLC, San Mateo, CA (US)

(72) Inventors: Paul Robert Schultz, Saratoga, CA (US); Roelof Roderick Colenbrander, Costa Mesa, CA (US); Ryan Hamilton Breed, Laguna Niguel, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/812,887

(22) Filed: Mar. 9, 2020

(65) Prior Publication Data

US 2020/0206636 A1    Jul. 2, 2020

Related U.S. Application Data

(63) Continuation of application No. 15/059,270, filed on Mar. 2, 2016, now Pat. No. 10,709,988.
(Continued)

(51) Int. Cl.
*A63F 13/352* (2014.01)
*A63F 13/335* (2014.01)
(Continued)

(52) U.S. Cl.
CPC ............ *A63F 13/79* (2014.09); *A63F 13/335* (2014.09); *A63F 13/352* (2014.09);
(Continued)

(58) Field of Classification Search
CPC ........ A63F 13/30; A63F 13/33; A63F 13/335; A63F 13/35; A63F 13/352; A63F 13/79
See application file for complete search history.

(56) References Cited

U.S. PATENT DOCUMENTS 8,961,302 B2 * 2/2015 Justice .................... A63F 13/79
463/29
2014/0024457 A1  1/2014 Justice et al.
(Continued)

OTHER PUBLICATIONS

Vlad et al: "Dynamic Resource Provisioning in Massively Multiplayer Online Games", IEEE Transactions on Parallel and Distributed Systems, IEEE Service Center, Los Alamitos, CA, US, vol. 22, No. 3, Mar. 1, 2011 (Mar. 1, 2011) pp. 380-395, XP011328276, ISSN: 1045-9219, DOI: 10.1109/TPDS.2010.82*Sec.6.1.2*.
(Continued)

*Primary Examiner* — James S. McClellan
(74) *Attorney, Agent, or Firm* — Penilla IP, APC

(57) ABSTRACT

Methods and systems for predicting instant play includes pre-loading one or more instances of select ones of games on one or more game consoles on a cloud game server. The loading of instances is based on usage history of the games. Users are assigned to select ones of the instances of the games loaded on the one or more game consoles, in response to user interaction detected at the select ones of the games exceeding a pre-defined threshold value. User interactions are monitored at the instances of the select ones of games assigned to the users. Based on the monitored interactions, the number of instances of the games loaded on the one or more game consoles are dynamically adjusted. The dynamic adjustment includes scaling up or scaling down the number of instances of the games loaded on the one or more game consoles.

9 Claims, 10 Drawing Sheets

Related U.S. Application Data

(60) Provisional application No. 62/129,745, filed on Mar. 6, 2015.

(51) Int. Cl.
    *A63F 13/79*         (2014.01)
    *A63F 13/355*      (2014.01)
    *A63F 13/45*        (2014.01)
    *A63F 13/44*        (2014.01)
    *A63F 13/48*        (2014.01)
    *A63F 13/77*        (2014.01)
    *A63F 13/358*      (2014.01)

(52) U.S. Cl.
    CPC .......... *A63F 13/355* (2014.09); *A63F 13/358* (2014.09); *A63F 13/44* (2014.09); *A63F 13/45* (2014.09); *A63F 13/48* (2014.09); *A63F 13/77* (2014.09)

(56) References Cited

U.S. PATENT DOCUMENTS

| | | |
|---|---|---|
| 2014/0066177 A1 | 3/2014 | Zalewski |
| 2014/0094315 A1* | 4/2014 | Stine .................... A63F 13/358 463/42 |
| 2015/0186545 A1* | 7/2015 | Krutzler .............. G06F 16/9574 715/234 |

OTHER PUBLICATIONS

EESR, EP,202035549, dated Dec. 14, 2020, 10 pages.

* cited by examiner

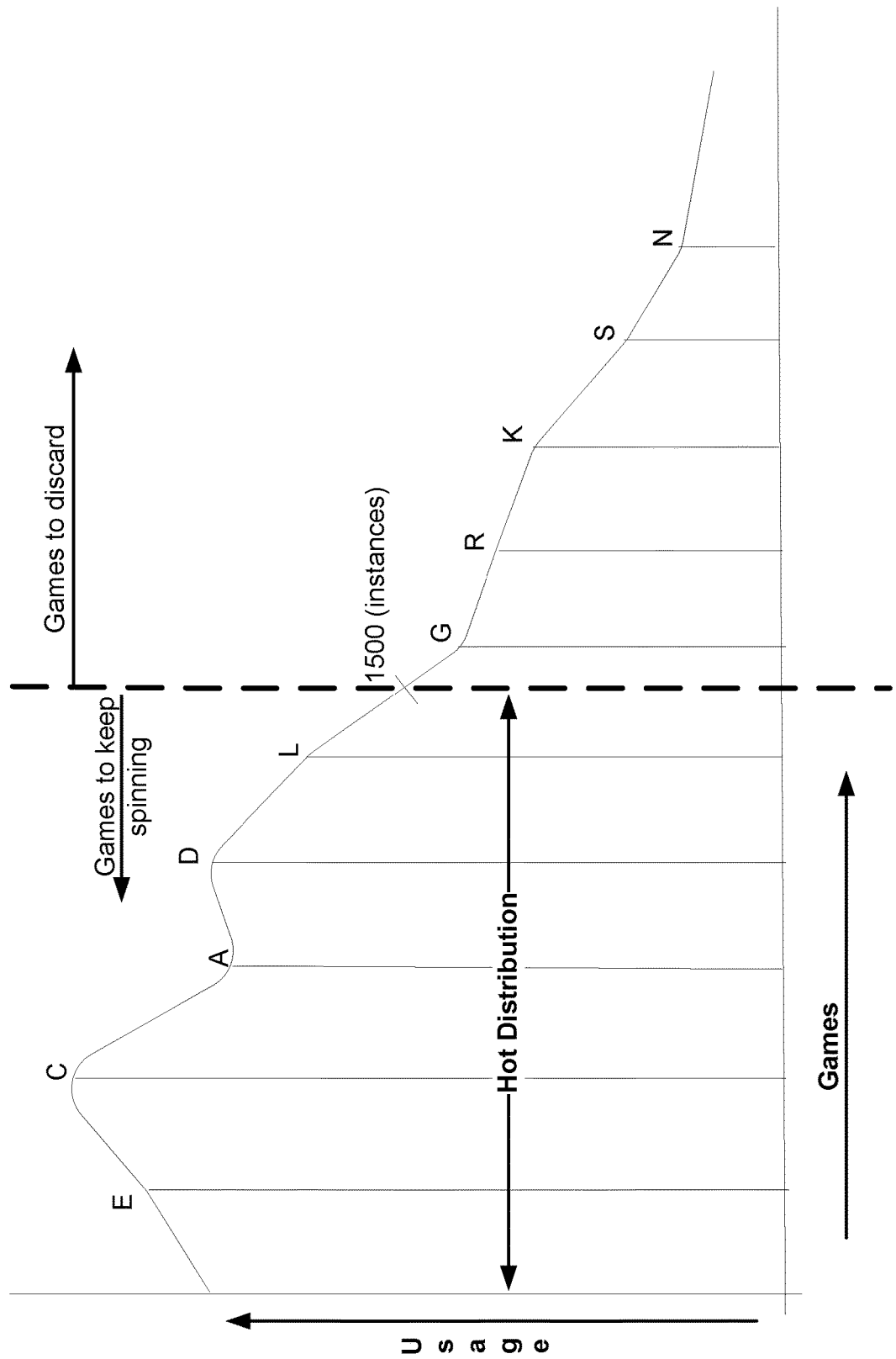

PREDICTIVE INSTANT PLAY FOR AN APPLICATION OVER THE CLOUD

CLAIM OF PRIORITY

This application is a continuation of and claims priority, under 35 U.S.C. § 120, to U.S. patent application Ser. No. 15/059,270, filed on Mar. 2, 2016, and entitled, "Predictive Instant Play For An Application Over The Cloud," which claims priority, under 35 U.S.C. § 119(e), to U.S. Provisional Patent Application No. 62/129,745, filed on Mar. 6, 2015, and entitled "Predictive Instant Play for an Application Over the Cloud", which are incorporated herein by reference in their entirety for all purposes.

FIELD

The present disclosure relates to systems and methods for providing games for user interaction, and more specifically to predictively loading the game for cloud gaming.

BACKGROUND

Description of the Related Art

One of the rapidly growing technologies is the field of cloud gaming. Users are able to access a number of games on a cloud gaming site over a network, such as the Internet, and begin interaction/playing the game. In order to select a game for game play, a user accesses his/her account on the cloud gaming site. The user is provided with a list of games that are available for the user account for game play. For example, when the user selects a game for viewing and/or game play, the user will have to wait till the game code is loaded, graphics engines initialized, graphics are loaded, game and user settings are uploaded, etc., before he can access the game for game play. The wait time for accessing and playing a select game may be longer for games that are graphic intensive. The waiting may cause the user to lose interest in the game and to stop interacting with the game site, resulting in a potential loss to the game developer/game site owner.

It is within this context that embodiments of the invention arise.

SUMMARY OF THE INVENTION

Embodiments of the present disclosure describe methods and systems that are used for preloading a game on a game cloud server ahead of time, based on a user's interest in the game, so that when the user actually selects the game, the game data is available to the user for instant viewing and/or playing.

According to some embodiments, game cloud server uses predictive logic to load or assign resources for the game session of a user. For example, by looking at a history file or historical databases of the user's past game play, it is possible to identify patterns of game play (e.g., past and present patterns) and identify types of games the user is likely to play. Using this predictive analysis, it is also possible to assign computing resources to a player's game session (e.g., game seat). The computing resources can, for example, be allocated when a user logs in to play. These resources are, in one embodiment, set or tuned, based on what the user is actually playing upon starting the session. The tuning can act to assign more cloud processing resources or reduce the assigned cloud processing resources based on user's current play. The tuning can, in one embodiment, use real gaming data to determine quality of service, so as to determine if there is a need for allocation of additional resources to improve the gaming experience or if the reduction in performance is due to connectivity, e.g., the internet service provider (ISP) drop in service or lack of quality bandwidth.

For the prediction operations, if the user is playing a game regularly, and the last few sessions have allowed the user to progress to different levels within the game, it is likely that the user will want to continue his progress in that game. If the user has stopped playing a game, e.g., for a period of time, then it is less likely that the user will be logging in to play that game. By analyzing the user's game play patterns and the games being used at different times, it is therefore possible to more efficiently allocate game system resources (e.g., CPU, GPU, memory, etc.) so that the user will have an enriching game play experience. In still other embodiments, the predictive game play analysis can also include comparing other similar players. If other players playing game A have a particular game play pattern, then it is possible to also look at these metrics and associated analytics in determining or predicting the amount of resources to allocate to the game seat, e.g., game session of the user.

In further embodiments, methods may be used to perform preloading of content. Preloading can reduce the wait time for a user to access the game for game view/game play that is typically prevalent in traditional applications. In some embodiments, the game specific code and data are preloaded ahead of time and user specific data is loaded when a user selects the game for game play. User specific data that may be loaded include user-specific settings, such as game objects, game level, game customizations, etc., to allow the user to begin game play. Usually game specific data takes a long time to load due to the complexity of the graphics and the user specific data takes short time to load, as only user customization needs to be loaded in preparation for game play. By preloading the game specific data, wait time for playing the game is considerably reduced.

In one embodiment, a method is provided. The method includes loading one or more instances of select ones of games on one or more game consoles on a cloud game server. The loading of instances is based on usage history available for each of the games on the cloud game server. Users are assigned to instances of select ones of the games loaded on the one or more game consoles, when a length of user interactions of the users detected at the select ones of the games exceeds a pre-defined threshold value. User interactions are monitored at the respective instances of the select ones of the games assigned to the users. Based on the monitored user interaction of the users, the number of instances of the games loaded on the one or more game consoles are dynamically adjusted. The dynamic adjustment includes scaling up or scaling down the number of instances of the games loaded on the one or more game consoles.

In some embodiments, when a game loaded on one or more game consoles is a single user game, assigning users includes assigning each instance of the game to a user. When the game is a multi user game, assigning users includes assigning each instance of the game to a plurality of users. The plurality of users may be co-located or remotely located.

In some embodiments, the method includes monitoring status of the instances of the select ones of the games assigned to the users to determine presence or absence of user engagement at the respective instances of the games assigned to the users. Based on the monitoring, one or more instances of specific ones of the games are re-assigned to one or more other users, when no user engagement is detected at the one or more instances of the specific ones of the games.

In some embodiments, an instant play log is maintained for the instances of each game available on the cloud game server. The instant play log keeps track of the usage history based on user interactions at each of the instances of each game assigned to the one or more users. Information provided in the instant play log is used to manage the instances of the games and for assigning the instances to different users.

In some embodiments, usage history for a particular game is determined for a pre-defined period of time using information provided in the instant play log and number of instances of the particular game is adjusted downward, when the usage history for the particular game during the pre-defined period of time indicates a demand that is less than the number of instances available for the particular game by a pre-defined threshold value.

In some embodiments, usage demand for a particular game is predicted using information provided in the instant play log, wherein the information in the instant play log provides usage history for the particular game and for contextually similar games. The number of instances of the particular game is adjusted based on the usage demand predicted for the particular game.

In some embodiments, loading an instance of a game includes loading generic game related data of the game. Assigning users includes loading user related data of the respective users for the game.

In some embodiments, a pre-defined threshold value for the number of instances of a game that can be instantiated on each game console in the cloud game server, is determined. One or more instances of the game are loaded in accordance to the pre-defined threshold value and the usage history of the game.

In another embodiment, a method is provided. The method includes detecting user interaction at a game title of a game provided on a cloud gaming site. In response to the detected user interaction, an instance of the game is pre-loaded on a game console of a cloud game server. The pre-loading is performed upon verifying that the user interaction detected at the game title of the game exceeds a pre-defined threshold time. The pre-loaded instance of the game is assigned to the user, in response to the user interaction. The assigning causes a portion of informative content for the game to be provided for rendering on a client device of the user. The user interaction is monitored at the instance to define usage history for the game. The usage history related to one or more games is used to predict usage demand for each of the one or more games and to manage the instances of the one or more games.

In some embodiments, the user interaction at the game title of the game is a passive user interaction.

In some embodiments, when a switching to a second game is detected from the user interaction, the pre-loading of the instance of the game is paused and the pre-loading of an instance of the second game is started at the cloud game server. The pre-loading of the second game is enabled upon verification that the user interaction at the second game exceeds the pre-defined threshold time.

In some embodiments, the pre-loaded instance of the game is retained at the cloud game server for a predefined period of time based on usage history of the game.

In some embodiments, the pre-loaded instance of the game is discarded after expiration of the predefined period of time, when no user interaction is recorded at the pre-loaded instance of the game during the predefined period of time.

In some embodiments, data from the pre-loaded instance of the game is used as demonstration data for presenting to a second user, in response to detecting user interaction from the second user at the game title.

In some embodiments, the pre-loaded instance of the game is de-assigned to the user and assigned to the second user, in response to detecting user interaction from the second user at the game. The pre-loaded instance is provided to the second user based on completion of the pre-loading and the availability of the pre-loaded instance of the game for game play.

In some embodiments, the assigning of the pre-loaded instance to the second user causes a portion of informative content for the game to be provided for rendering on a client device of the second user.

In some embodiments, the instance of the second game is pre-loaded to a second game console of the cloud game server that is different from the game console used for pre-loading the instance of the game.

In some embodiments, the second game console is selected for pre-loading the instance of the second game based on availability of resources at the game console and the second game console, wherein the resources includes bandwidth resources.

In some embodiments, the pre-loading of the instance of the game is performed when the instance of the game is not available on the cloud game server.

In another embodiment, a system is disclosed. The system includes a cloud gaming site that is communicatively connected to a client device over a network. The cloud gaming site is configured to provide an instance of a select one of a plurality of games to the client device, in response to detecting user interaction at a game title of the select one of the plurality of games available on the cloud gaming site. The cloud gaming site includes a game pre-loader module that is executed on a processor in the cloud gaming site and is configured to, detect the user interaction at the game title of the select one of the plurality of games available at the cloud gaming site; identify a data center that hosts the select one of the plurality of games; signal a cloud game server within the identified data center to pre-load an instance of the select one of the plurality of games on a game console available on the cloud game server, when the user interaction detected at the game title exceeds a pre-defined threshold time; assign the instance of the select one of the plurality of games to a user, in response to the detected user interaction, the assigning of the instance results in a portion of informative content for the select one of the plurality of games to be returned to the client device for rendering; and monitor the user interaction at the assigned instance to define usage history for the game, wherein the usage history is used to manage instances of the plurality of games on the cloud game server.

In another embodiment, a computer-readable medium with computer executable instructions stored thereon is disclosed. The computer-readable medium includes program instructions for loading one or more instances of select ones of games on one or more game consoles of a cloud game server, wherein the loading of instances is based on usage history available for each of the games on the cloud game server; program instructions for assigning users to instances of the select ones of the games loaded on the one or more game consoles, when a length of user interactions of the users detected at the select ones of the games exceeds a pre-defined threshold value; program instructions for monitoring user interactions at the respective instances of the select ones of the games assigned to the users; and program instructions for dynamically adjusting the number of instances of the games loaded on the one or more game consoles based on the monitored user interactions of the users, wherein the dynamically adjusting includes scaling up or scaling down the number of instances of the games loaded on the one or more game consoles.

Some embodiments of the present invention address the need for reducing wait time for accessing the games by providing ways to pre-load one or more instances of games on one or more game consoles on a cloud game server based on usage history and/or predicted demand for each game. Pre-loading the game code and game data allows a user to access the game for instant view and instant game play, as the game code has already been pre-loaded. The user may have to wait for the user related data to load before game play. However, the wait time involved in loading the user related data is very minimal compared to the game related data. In some embodiments of the present invention, the pre-loading is based on detecting passive user interaction, such as a hover activity, etc., at a game title on a cloud gaming site. The number of instances of each game that is selected for pre-loading can be adjusted in accordance to predicted usage demand of the respective game at different periods of time. Usage demand may be obtained by analyzing usage history of each game, so that an optimal number of instances of each game are available at any given time, providing users quick access to an instance of any game available on the cloud game server.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 4 illustrates a game usage graph that is used to determine which games to retain and which games to discard, in accordance with one embodiment of the present invention.

DETAILED DESCRIPTION

Figure 1:
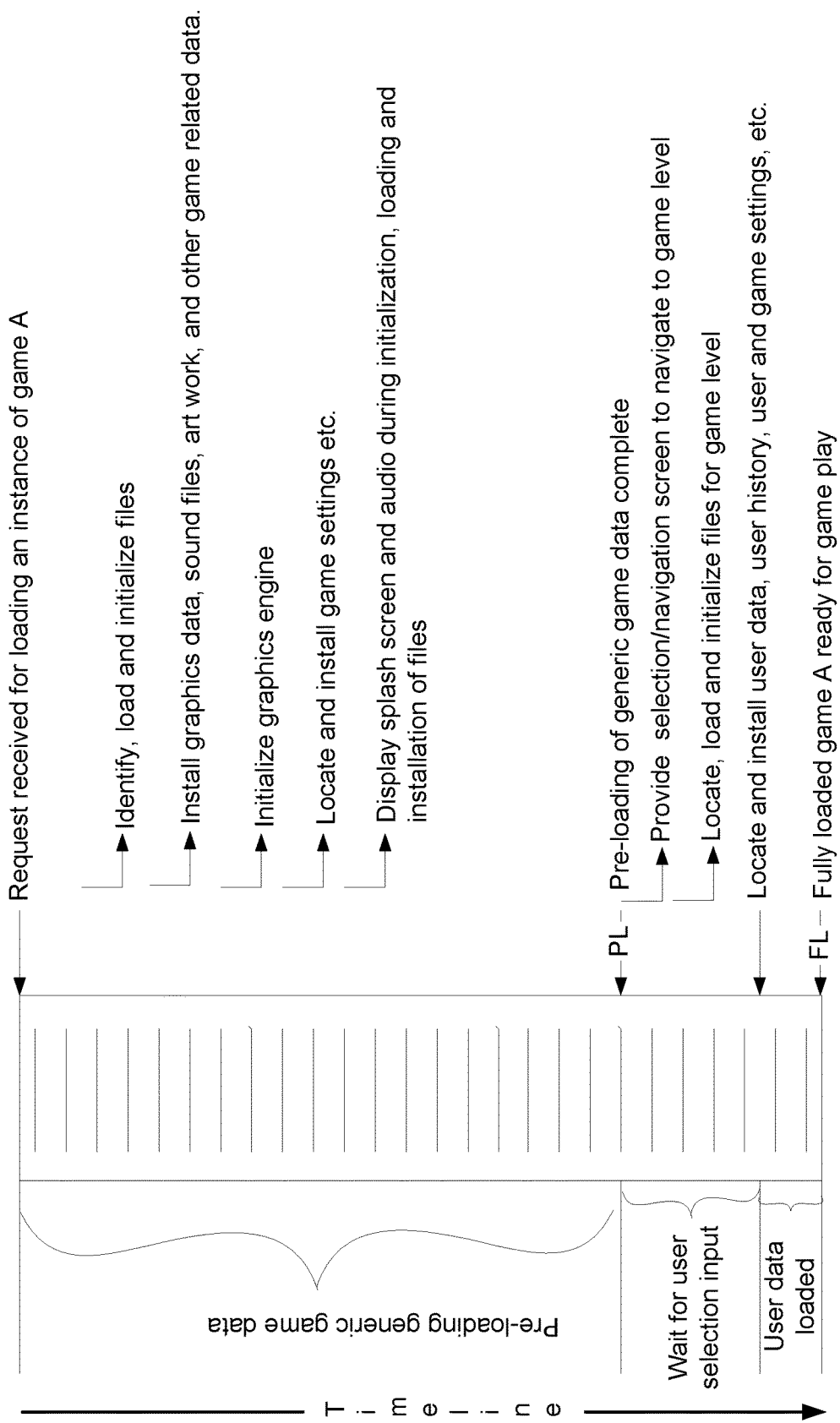
FIG. 1 illustrates an exemplary time line for loading game code and making it available to a user, in accordance to an embodiment of the invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to an embodiment of the present invention a user may access a cloud gaming site through a user account and interact with a game title from a list of game titles that are available for the user account at the cloud gaming site. The interaction may be a passive interaction, such as a hover activity, a mouse-proximity activity, etc. In response to the user interaction, the cloud gaming site will determine if the length of time of user interaction at the game title of a particular game is at least for a pre-defined threshold time. If the length of time of user interaction at the particular game title meets or exceeds the pre-defined threshold time, the cloud gaming site sends a signal to a server at a data center within the cloud gaming system to pre-load game content and stream a portion of informative content for the particular game to the user's client device for rendering. User interaction at the game title of the particular game is continuously monitored and when the user interaction corresponds to an active user interaction, such as the game title selection, the pre-loaded game content is made readily available to the user to allow viewing or game play of the selected game. User related content, including user customizations, etc., may be uploaded after selection of the particular game for game play. The user interaction during game play is used to adjust outcome of the selected game. The user interaction at the instance defines usage history for the game. The cloud gaming site manages the instances of a plurality of games based on the information captured in the usage history.

The pre-loading of game content ahead of a user's game selection results in the game content being readily available for immediate game play to a user. By pre-loading the game content, the cloud gaming site provides a way to substantially reduce the wait time for the user while providing the user with access to the streaming game content, thereby enhancing a user's game play experience. Satisfied user experience relates to longer user engagement at the game hosting sites, which can relate to greater revenue for the game hosting sites. Other advantages will become apparent to one skilled in the art based on the detailed description of the various embodiments.

In some embodiments, game cloud server uses predictive logic to load or assign resources for the game session of a user. For example, by looking at a history file or historical usage database that includes the user's past game play, it is possible to identify patterns, e.g., past and present patterns, of game play and identify types of games the user is likely to play. Using this predictive analysis, it is also possible to assign computing resources to a player's game session (e.g., game seat). The computing resources can, for example, be allocated when a user logs in to play. These resources are, in one embodiment, set or tuned to what the user is actually playing upon starting the session. The tuning can act to assign more cloud processing resources or reduce the assigned cloud processing resources. The tuning can, in one embodiment, use real gaming data from the current game session to determine quality of service. Quality of service information may be used to determine if there is a need for additional resources to improve the gaming experience. Additionally, the quality of service (QOS) may be used to pin point issues that may affect the gaming experience. For example, QOS data may be used to determine if the reduction in performance is due to connectivity issues resulting from the internet service provider's (ISP) drop in service or lack of quality bandwidth.

FIG. 1 illustrates an example set of operations that have to be performed by a server within a data center associated with a cloud gaming site, when a user request for game play of a game title is received at the cloud gaming site. When the cloud gaming site receives a user request for game play of a game, a data center for hosting the game associated with the selected game title, is identified and the request is sent to the identified data center for instantiating the game for the selected game title. In response to the request, a server at the data center identifies the game code, loads the identified game code and initializes the files related to the game code in preparation for presenting the game content to a user. Game data associated with a game includes generic game data and user-specific game data. Therefore, initializing the files includes identifying, loading, and initializing generic game data and user-specific game data. Initializing generic game data may include initializing graphics engine, installing graphics data, initializing sound files, installing art work, etc. Initializing user specific data may include locating and installing user data (including user customization), user history, game history, etc. Loading of the generic game data may take anywhere from few seconds to few minutes depending on the complexity of the game and intensity of graphics of the game, causing unnecessary wait for the user.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, the audio content may be rendered and a selection or navigation screen is presented for user selection and/or customization. User selection input provided at the selection screen may include game level selection, game icon(s) selection, game mode selection, game winnings, other user-related data that may require uploading of additional game content. Uploading user-related data based on user selection input provided at the selection screen can cause additional delay before the game content is made available to the user for game play.

In some embodiments, game content is made available by streaming the game content from the game cloud system to a user's computing device for viewing and interacting. After loading user-related data, the game content is available for game play. In order to reduce the amount of wait time that is caused by the game file loading and initialization, it would be advantageous to pre-load at least the game specific code and related game files.

Figure 2:
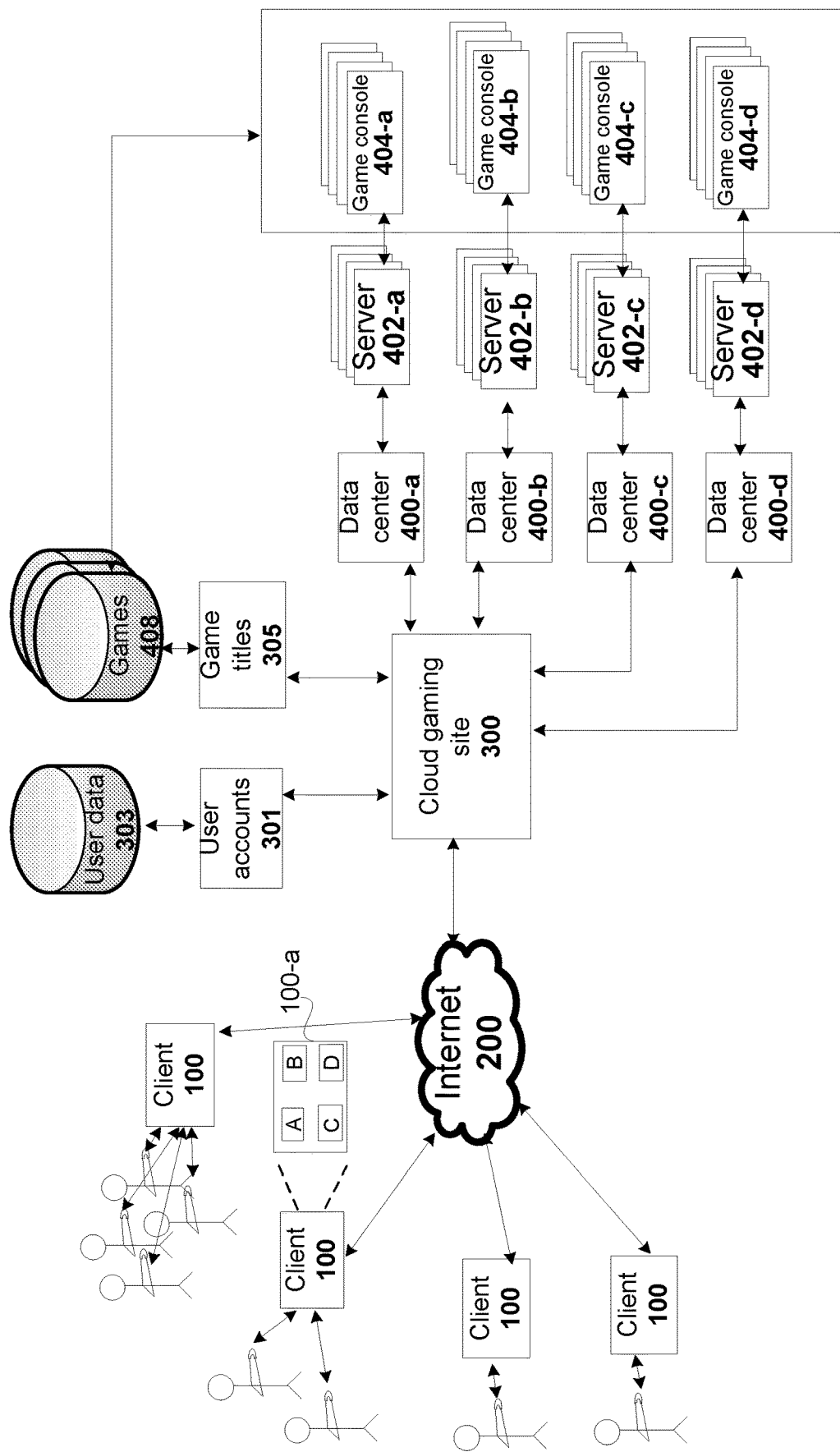
FIG. 2 illustrates a simplified block diagram of an exemplary system that is used to preload game content onto a cloud game server, in accordance with an embodiment of the present invention.

FIG. 2 illustrates an example system used to pre-load the game files for a game available at a cloud gaming site, so that the wait time to access the game is substantially reduced. The system includes a plurality of client devices 100 that are communicatively connected to the cloud gaming site 300 over a network 200, such as the Internet. When a request to access the cloud gaming site 300 is received from a client device 100, the cloud gaming site 300 accesses user account information 302 stored in a user data store 304 to identify a user associated with a client device 100 through which the request is initiated. In some embodiments, the cloud gaming site 300 may also validate the identified user in order to determine all the games the user is authorized to view and/or play. Following user account identification, validation, the cloud gaming site accesses a game titles module 306 to determine the game titles that are available at the cloud gaming site 300 for the user account initiating the request. The game titles module 306, in turn, interacts with a games database 408 to obtain the game titles for all the games that are available for the cloud gaming site. As new games are introduced, the games database 408 is updated with the game code. The game titles module 306 will query the games database 408 that includes current list of games available for the cloud gaming site and obtain game titles of select ones of games that are available for the user account.

The client device 100 from where the request is initiated may or may not be registered with the cloud gaming site 300, when the request was initiated. If the user of the client device 100 initiating the request is not a registered user, then the cloud gaming site may identify the user as a new user and select the game titles (for e.g., a default set of game titles) that are appropriate for a new user. The identified game titles are returned to the client device 100 for presenting on a display screen 100-a, as shown in FIG. 2.

User interaction at one of the game titles rendered on the client device 100 is detected and a signal is sent from the client device 100 to the cloud gaming site 300. The signal includes the game title information where the user interaction was detected and the amount of time spent interacting with the game title. The user interaction may be a passive user interaction, such as a mouse-over action, (i.e., hovering action) etc. In some embodiments, the signal is generated when the amount of time spent at the game title exceeds a predefined threshold time. In other embodiments, the signal is generated as soon as the user interaction is detected at the game title on the client device 100. In such embodiments, the cloud gaming site 300 keeps track of the amount of time spent at the game title and performs the steps to instantiate the game when the amount of time spent at the game title exceeds the predefined threshold time. In response to the signal received from the client device 100, the cloud gaming site 300 proactively determines a data center 400 where the game is being hosted and sends a signal to the identified data center 400 to pre-load an instance of the game associated with the game title at which the user interaction is detected at the client device 100. In some embodiments, more than one data center 400 may be hosting the game. In such embodiments, the cloud gaming site 300 may determine the geo location of the client device 100 initiating the request, and identify a data center 400 that is geographically proximal to the client device 100 and signal the data center 400 to pre-load the game. The geo location of the user may be determined using Global Position System (GPS) mechanism within the client device, the client's IP address, the client's ping information, to name a few. Of course, the aforementioned ways to detect the geo location of the user are just examples and other types of mechanisms or tools may be used to determine the geo location of the user. Identifying a data center 400 that is close to the client device 100 is to minimize latency that may be caused during transmission of game data generated in response to user interaction with the game. In some embodiments, the identified data center (e.g., 400-*a*) may not have the required bandwidth or resource capacity to host the game, or the resources may be overused or allocated to other games or applications that are being hosted at the data center 400. In these embodiments, the cloud gaming site 300 may identify a second data center (e.g., 400-*b*) that is geographically close to the client device 100 for pre-loading the game data. The pre-loading of the game data includes loading game code and executing an instance of the game.

In response to receiving the signal from the cloud gaming site 300, the identified data center 400 may select a server 402 at the data center 400 to instantiate the game on the server 402. The server 402 is selected based on the hardware, software capabilities available and the game requirements specified for the selected game. The server 402 may include a plurality of game consoles 404 and the server 402 may determine which one of the plurality of game consoles 404 to use to pre-load the game. The game console 404 may be similar to an independent game console, or may be a rack-mounted server or a blade server. Each blade server, in turn, may include a plurality of server blades. Each server blade is equipped with required circuitry for instantiating a single dedicated application, such as the game. In some embodiments, each server blade may be capable of instantiating more than one game or application. Of course, the game console 404 described above is an example and should not be considered restrictive. Other types of game consoles, including game stations, other computing devices, etc., and other forms of blade server may also be engaged for hosting the identified game.

Once the game console 404 is identified, the generic game-related code for the game is pre-loaded onto the game console 404 and a signal is returned to the client device 100 via the cloud gaming site 300 over the network 200 identifying the game console 404 on which the game is being instantiated. Further user interaction at the game title, such as game selection, would cause the pre-loaded game to be made available to the user without any delay.

If, during the pre-loading or after the pre-loading, the user interaction, such as hovering action, is detected at a second game title at the client device 100, a signal is sent to the cloud gaming site 300 identifying a switch in the game title caused by the user interaction. The switch signal may be sent by the client device 100 after it is determined that the user interaction (like hovering activity) at the second game title exceeds the pre-defined threshold time or may be sent to the cloud gaming site 300 where the user interaction is monitored to determine if the amount of time spent at the second game title exceeds the pre-defined threshold time. In any case, in response to receiving the switch signal from the client device 100, the cloud gaming site 300 will, in turn, send a signal to the data center 400 at which the game was being instantiated to suspend or pause the pre-loading activity for the game title (if the pre-loading was not complete) or pause the game (if the game was fully pre-loaded). Additionally, the cloud gaming site 300 may begin pre-loading the second game by replicating the operations followed for pre-loading the game as described above. Accordingly, the cloud gaming site 300 would perform the operations of identifying a data center 400 for the second game title, sending signal to the data center 400 to instantiate the second game associated with the second game title on a game console 404 within a server 402 of the data center 400. Once the second game is pre-loaded, the server 402 of the data center 400 may send a signal informing the cloud gaming site 300 of the availability of the pre-loaded second game. It should be noted herein that the game console 404, the server 402 and/or the data center 400 for instantiating the second game may be different from the one on which the first game was instantiated or it could be the same. The data center, server and game console are identified based on availability of system and communication resources (e.g., if more than one application can be instantiated on the game console), and based on resource requirements, including communication bandwidth requirements of the game.

In some embodiments, the partially pre-loaded or fully pre-loaded first game may be maintained on the allocated game console 404 for a pre-defined period of time to determine if user interaction from the same user or a different user is detected at the first game. During the pre-defined period of time, when the user interaction is detected from a user (either the first user or a second user) at the partially pre-loaded game, the pre-loading of the partially pre-loaded game is resumed. Alternately, if the user interaction of the first or the second user is received at the fully pre-loaded first game within the pre-defined period of time, then the first game content is streamed to the first or the second user's client device 100 for user viewing and/or game play, depending on whether the user interaction is a passive user interaction (for e.g., hovering, etc.) or an active user interaction (for e.g., user selection). In other embodiments, the partially pre-loaded or fully pre-loaded instance of a game may be discarded immediately after detecting a switch in the game. This may be desirable if there is a demand for the computing and communication resources at the allocated game console 404. The discarding of the instance would free up the computing and communication resources so as to enable allocation of such resources for the second game or other application hosted at the game console 404.

Figure 3A:
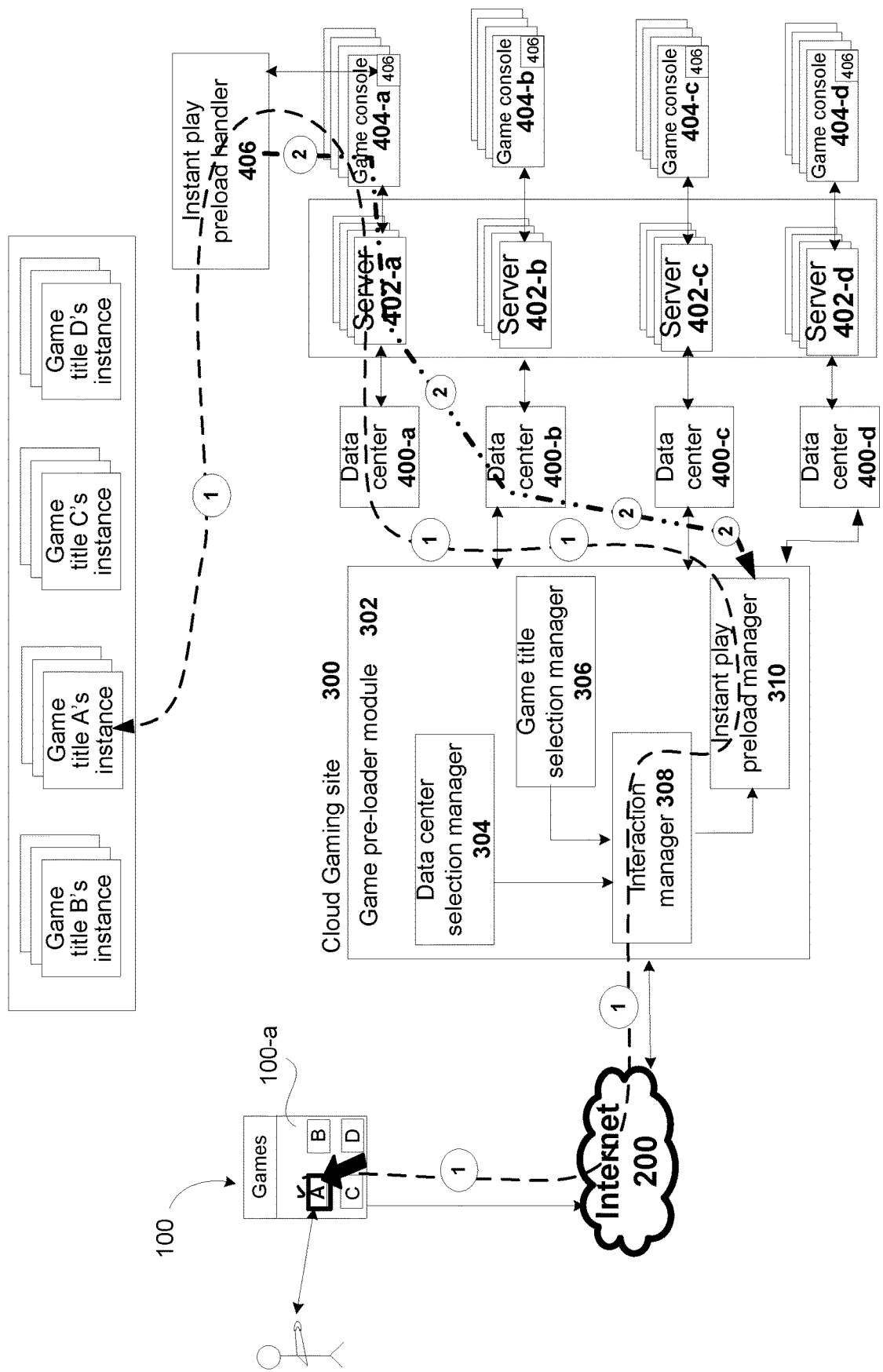
FIG. 3A illustrates various modules of an exemplary game pre-loader module within a cloud gaming site, in accordance with an embodiment of the present invention.

FIG. 3A illustrates an example game pre-loader module 302 executing on a processor within the cloud gaming site 300 and an instant play preload handler 406 within a data center 404 that is used to pre-load a game selected by a user, in response to a user interaction detected at a game title of the game on the client device 100. The user interaction, as mentioned above, may be a passive user interaction, such as hover activity, cursor proximity, etc. A user account is used to access the cloud gaming site 300. In response to a request to access the cloud gaming site 300, the cloud gaming site 300 authenticates the user account and returns a list of game titles that are available for the user account at the cloud gaming site 300 for rendering on a display screen of the client device 100 for user selection. In some embodiments, each game title presented for the user account may include game code and informative content, such as brief description of the game, one or more representative game scenes or game images, game rating, game clips or game recordings, game type, etc. When user interaction, such as hovering activity, is detected at or near one of the game titles rendered on the client device 100, such as near game title A as shown in FIG. 3A, the client device 100 sends a signal to the cloud gaming site 300 about the detected user interaction. The signal includes the type of activity (i.e., active or passive activity) detected at the client device 100 as well as game title identifier of a game at or near which the activity was detected. An interaction manager 308 within the game pre-loader module 302 executing on the cloud gaming site 300, receives the transmitted signal and examines the signal to identify the type of user interaction (hovering activity) and the game title identifier included in the signal. The interaction manager 308 may interact with a game title selection manager 306 to use the game title identifier to identify the game title from among the game titles available for the user account at which the user interaction (i.e., hovering activity) was detected. In addition to interacting with the game title selection manager, the interaction manager 308 may determine the amount of time of hovering activity detected at the game title either from information provided in the signal or from continual monitoring of the signal originating from the client device 100. When the amount of time of user interaction at a specific game title exceeds a pre-defined threshold time, the interaction manager interacts with a data center selection manager 304 using the game title identifier to determine which one of a plurality of servers to forward the user's request for servicing. The pre-defined threshold time may be defined to be long enough (for e.g., 8-10 seconds) to identify the user's lingering interest in the particular game title.

The data center selection manager 304, in one embodiment, may maintain user accounts, login information for each user account, history of games available in a data center, history of games purchased or available to the user account, billings, etc., and such maintained information is consolidated across all data centers. The consolidated information is used to identify appropriate data center to direct the user's requests. The consolidated information may identify a data center that is normally assigned to service the user's request. In some embodiments, the data center selection manager 304, instead of using the data center identified in the consolidated information, may instead identify one or more data centers that are hosting the game and are proximal to the client device 100 to service a user's request. Finding alternate data centers may occur when the data center identified from the consolidated information may not have the communication bandwidth or sufficient resources to service the user's request. As a result, the data center selection manager 304 may identify one or more other data centers that are set up to host the game and have the resources (i.e., communication and processing resources) required for the game identified in the request. More than one data center that host the identified game may be identified. In such a case, the data center selection manager 304 may, in one embodiment, determine the geo location of the client device 100 and identify a data center that is geographically proximal to the geo location of the client device 100 initiating the request, so as to reduce latency during streaming of the game data to the client device 100. The proximal data center may be identified based on GPS information, IP address or other ping information associated with the client device of the user. The game pre-loader module 302 receives the data center information provided by the data center selection manager 304 and sends a pre-load signal request to an instant play preload manager 310 to begin pre-loading the game data for the selected game title at the identified data center.

The instant play preload manager 310 sends a signal to the data center 400-a identified by the data center selection manager 304 to begin pre-loading the game data for the identified game title. The data center 400-a, in response to the signal, identifies one of a plurality of game servers 402-a for loading the game. The server may be identified based on the resources required, resources available, bandwidth capability, etc. The game server 402-a may include a plurality of game consoles on which to execute the game and the game server 402-a identifies any one of the plurality of game consoles 404-a through 404-n available at the game server 402-a to pre-load the game. An instant play preload handler 406 at the game server 402-a is used to preload an instance of the game and to manage the instances of a plurality of games hosted at the data center 400-a.

For example, when a user, user 1, hovers on game A's game title at the client device 100 for a period of time (for e.g., 5-7 seconds) that is less than a pre-defined threshold time (for e.g., 10 seconds) and then moves on to hover over game C's game title for a period of time (for e.g., 25-30 seconds) that exceeds the pre-defined threshold time, the instant play preload manager 310 of game pre-load module 302 sends a signal to the appropriate data center 400 to preload game title C. It should be understood that the pre-defined threshold time provided in the above examples is just exemplary, and the threshold can be much less, e.g., less than a second, less than 2 seconds, less than 3 seconds, less than 4 seconds, etc. Generally, however, a threshold can be set, which determines when the preload will be triggered.

In another example, when user 1 hovers on game A's game title for a period of time that meets or exceeds the pre-defined threshold time then the game pre-load module 302 will send a signal to the appropriate data center 400 to begin pre-loading game A. While game A is being pre-loaded or after the completion of pre-loading game A, user 1 may move on to hover over game C without selecting game A. As used herein, to "hover" means that some icon, pointer, selector, eye gaze, or indicator has been associated with a selectable game title (e.g., in some graphical form). In one specific example, user 1 can use a controller to highlight the game title, e.g., without fully selecting the game title. In some examples, highlighting the game title may provide more information about the title, e.g., show text, images, screen shots, sample video clips, and the like. This highlighting may take place when the user 1's eye gaze, pointer, icon or indicator was first on game title A and then switched to game title C and user 1 has not selected either of the game title for playing or viewing.

The game pre-load module 302 may detect the switch in user interaction at a different game title (i.e., switching from game A to game C) and determine the length of time of user interaction at the switched game title, game C. When the user interaction (i.e., hover activity) over game C meets or exceeds the pre-defined threshold time, the game pre-load module 302 will identify the data center 400 that can host game C and send a signal to the identified data center 400 to preload game C. At the same time, the game pre-load module 302 will send a signal to the data center 400 that is used for pre-loading game A to pause the pre-loading of game A, if game A is not fully pre-loaded. It should be noted that the server 402 and/or the data center 400 that is used for pre-loading game C may be same or different from the server and/or the data center used to pre-load game A. The game console 404 on which an instance of game C is being pre-loaded, in one embodiment, is different from the game console 404 on which an instance of game A is being pre-loaded. In another embodiment, based on the capacity and capability of a game console, an instance of game A may be paused and an instance of the game C may be pre-loaded on the same game console, provided game C is available at the data center of the game console where the instance of game A is pre-loaded. The partially pre-loaded or fully pre-loaded game A may be maintained in the game console and used to service a request from a second user, user 2, when received.

In one embodiment, the partially pre-loaded or fully pre-loaded game A may be maintained at the game console for a pre-defined period of time. During this time, when subsequent user interaction, indicative of the user's interest, from the same user (i.e., user 1) or a different user (e.g., user 2, user 3, etc.) is received for the game title A, the pre-loading of the partially pre-loaded game A is resumed. Upon completion of pre-loading and upon detecting continuous user interaction of the user (user 1 or user 2, user 3, etc.) at the game title A, the pre-loaded game A is assigned to the user. A game that is available on a game console for user assignment is considered to be "spinning". Spinning of a game, as used in this application, is defined to be a game that is pre-loaded and waiting for assigning to a user for game play based on user interaction (i.e., user selection). In one embodiment, the fully pre-loaded game A may be assigned to user 1 when user 1 selects game A for game play, and may also be provided to user 2 as demonstration data, if the user interaction provided by user 2 is a passive user interaction, such as hovering. If, however, the user interaction of user 2 is an active selection of game A, then the pre-loaded game A may be made readily available to user 2 for game play if user 1 has released game A or if game A has been unassigned to user 1 due to lack of interaction with game A. Otherwise, a second instance of game A may be instantiated either at the same game console or a different game console within the same data center, for example, and provided to user 2 for game play. When user 2 is done interacting (i.e., passive interaction) with game A and moves on to game B or game C, user 2's shift in interest is detected causing the game pre-loader module 302 to release the assignment of game A to user 2. The released and free instance of game A (i.e., spinning game A) may be re-assigned to another user, user 3, when a passive or active user interaction is detected at the game title on user 3's client device.

A number of instances of one or more games may be spinning at a given time, meaning they are pre-loaded on different game consoles and available for assigning to the users for instant game play. These instances of one or more partially or fully pre-loaded games, in some embodiments, may be maintained for a pre-defined period of time at the respective game consoles. When no user interaction is detected at the respective game title(s) during the pre-defined period of time or based on usage demand for the current period, the number of instances of one or more games may be pared down, including discarding some instances of games or some games altogether, thereby freeing up the game console resources so that other games can be instantiated. Such paring down may be done periodically. The game pre-loader module 302 may interact with the preload handler 406 at the different data centers to manage the instances of the different games at the respective data centers. The game pre-loader module 302 may determine which pre-loaded instances of games to keep and which ones to discard based on usage criteria, such as history of use of each game, time period (for e.g., time of day, time of week, etc.), popularity of the game, popularity of related games in the game genre, etc. As the number of pre-loaded instances of one or more games required for different time periods may change based on the usage criteria, predicted usage demand, etc., the number of pre-loaded instances may be dynamically adjusted to meet such variations in the usage demand. For example, based on the usage history and/or predicted usage demand, instances of some games may be adjusted upward at a certain time and downward at a different time to ensure that when a user interacts with the game title at the cloud gaming site at different times, appropriate number of game instances are readily available for assigning. As a result, in some embodiments, based on the usage history and/or predicted usage demand, all pre-loaded game instances of certain ones of games may be discarded. However, in such embodiments, the cloud gaming site may maintain the pre-loaded game instances of these games for some predefined period before discarding, to ensure that these game instances are not discarded prematurely (for e.g., a newly released game for a specific genre).

It should be noted that the pre-loading of a game loads the generic game portion of a game. User-specific portion of the game, such as game winnings, game levels, game icons, game objects, user-specific game customizations, are not pre-loaded when passive user interaction is detected but is loaded when an active user interaction (i.e., user selection) is detected at the game title.

Figure 3B:
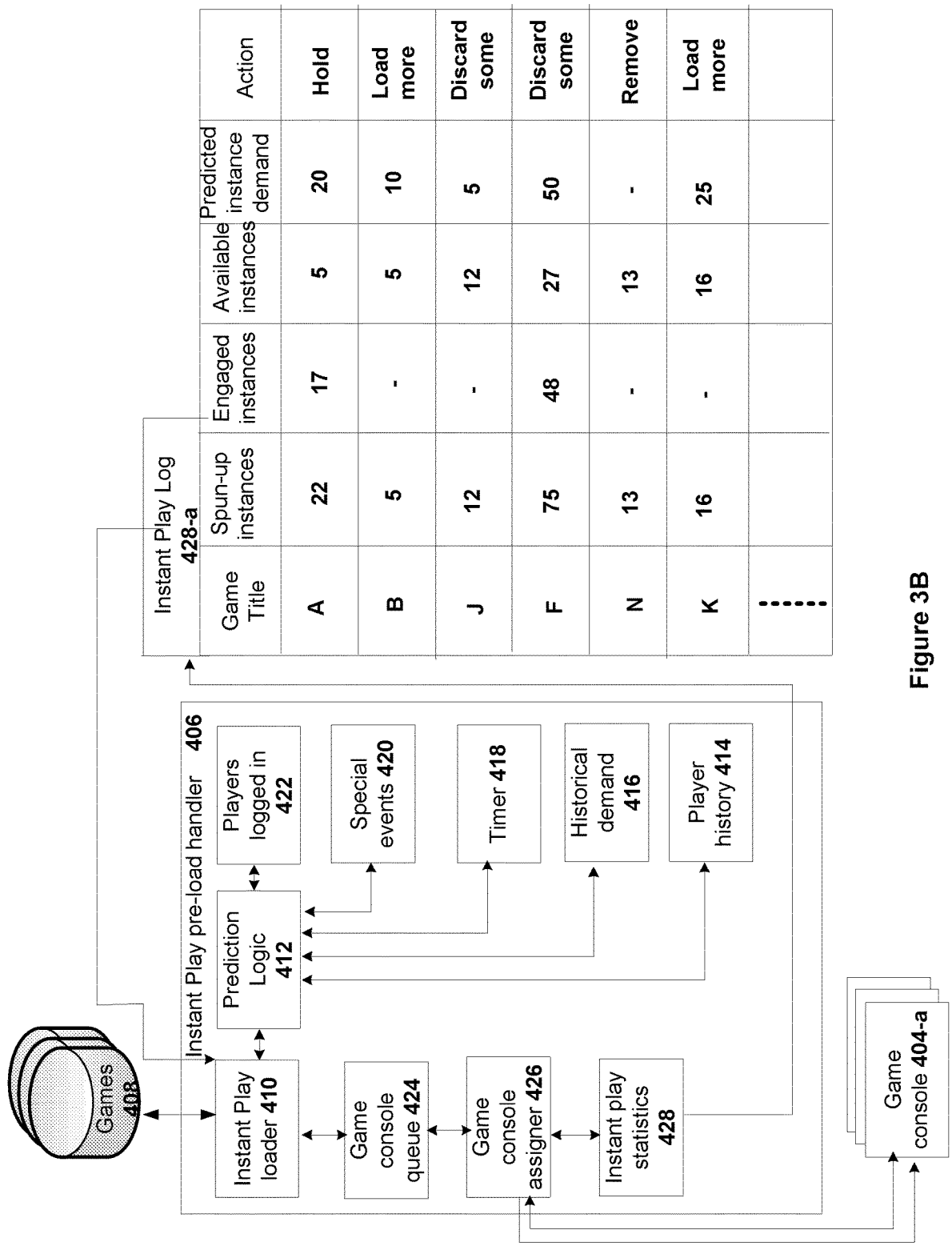
FIG. 3B illustrates an exemplary instant play pre-load handler module within a game server of a data center that communicates with the cloud gaming site to provide instances of game on the game server, in accordance with one embodiment of the present invention.

FIG. 3B illustrates, in one embodiment, an example instant play pre-load handler (or simply "pre-load handler") 406 executing on each server in the various data centers accessible by the cloud gaming site. The pre-load handler 406 is used for pre-loading an identified game on to a game console 404 at a data center 400 and managing the instances of the game to ensure that the instances of the game are readily available for game play, when requested. In this embodiment, the system periodically analyzes usage history of each game and such analysis is done without requiring any user interaction at the client device 100. Based on analysis of information provided in the usage history, the demand for each game is predicted. The number of instances of each game that is spun is in accordance to the predicted user demand. In one embodiment, the usage history may be obtained by analyzing the session logs, user logs, etc., of a plurality of users. Alternately, the user interactions of each user at each game title may be gathered into a separate usage history log and information in this history log is analyzed to predict the usage demand of each game title.

To assist in the analysis, in one embodiment, the pre-load handler 406 includes a prediction logic 412 that is used to predict the usage demand of each game and to dynamically adjust the number of instances of the different games available at the cloud gaming site 300. The prediction logic 412 receives input from a plurality of modules, such as historical demand module 416 that provides usage history of the various games, a timer module 418 that provides the time of day for which usage demand needs to be determined, player history module 414 that provides each player's interest and engagement in different games, players logged in module 422 that provides information on the number of players that are currently logged into their respective user accounts and accessing the cloud gaming site 300 and information on which game instances the player's are interacting with or are showing interest by providing passive user interaction. The prediction logic 412 may also interact with special events module 420 that provides information about different events that are scheduled for different games either by different game developers or at the cloud gaming site 300 at different periods of time. Some of the special events may include release of a new game in a particular genre, special sales/purchase event, etc. The various modules provide valuable input to the prediction logic 412, which analyzes the various inputs to determine which ones of the games need to be retained, which games to discard, which games instances need to be increased/decreased during different time periods, etc. The analysis from the prediction logic 412 is used to maintain the appropriate number of instances of each game so that when actual user interactions are detected at different game titles, sufficient number of game instances is readily available for assigning to the respective users.

The analysis from the prediction logic 412 is provided as input to an instant play loader module 410. The instant play loader module 410 uses the input from the prediction logic 412 to determine if instances of one or more games need to be executed, and interacts with games database 408 to extract game code for a game, identifies the game console where the game can be instantiated, and queues a request for pre-loading the game code for the game in the respective game console queue 424. As mentioned earlier, each data center 400 may include a plurality of game servers 402, with each game server 402 hosting one or more game consoles 404. Each server 402 may instantiate a plurality of instances of a particular game or may instantiate one or more instances of a plurality of games. It should be noted that each game instance of a game is assigned to one user, when the game is a single-user game or is played in a single-user mode, or to a plurality of users (in a multi-user mode of the game). As a result, when more than one user/group of users provides user interactions, such as hovering action, etc., at a particular game simultaneously, each user or each group of users' needs to be assigned his/their own instance of the game. Further, in one embodiment, each game console may instantiate one game application. In other embodiments, based on the circuitry, each game console may be able to instantiate a plurality of instances of one game or instantiate one or more instances of a number of games. In some embodiments, each game console emulates a virtual machine, in that the game console shares its hardware with multiple instances of one game, single instances of multiple games or multiple instances of multiple games.

The game console queue 424, in one embodiment, may be specific to each data center and include a plurality of pre-load requests for one or more games available at the respective data center. In one embodiment, the game console queue 424 from different data centers may be consolidated to form a consolidated game console queue. The consolidated game console queue is used to manage the plurality of pre-load requests for the different games hosted by the different data centers accessible from the cloud gaming site.

A game console assigner 426 assigns each entry in the game console queue 424 to the corresponding game console. The assignment of the game console may be based on one or more assignment criteria, such as system requirements of the game, geo location of the data center in which the game console is available, availability of the game console, availability of communication bandwidth and other resources at the game console, time of day, usage demand during the time of day, etc. Based on the assignment criteria, the game console assigner 426 assigns the game code to specific ones of the game consoles for instantiating and when the specific ones of the game consoles do not have sufficient bandwidth to instantiate a particular game or is not available to service the request, the game console assigner 426 may locate a second game console with similar console characteristics within the data center and re-assign the game to the second game console. Along similar lines, if the game console assigner 426 determines that a particular server within a data center that includes the game console is not available for servicing any request or may not have the necessary resources to service the request, the game console assigner may locate a different game server and an alternate game console within the different game server to send the game console request for servicing.

In some embodiments, a user session is created when a user accesses the cloud gaming site by logging in through a user account. The session allocates a "game seat" for the user. The game seat identifies the processing resources that need to be allocated by the cloud gaming site, such as the processing power, GPU power, memory, communication bandwidth, etc., for the user to enable the user to have a satisfactory game play experience.

The processing resources identified for the game seat of the user may be based on predicting prior usage of the user and type of game the user selects to play, and such information may be provided by the prediction logic 412 of the pre-load handler 406. Thus, when the user logs in to the cloud gaming site, the prediction logic 412 will figure out the resources to assign to the game seat (i.e., user session) based on historic game play of the user. Once the user's session is created and the necessary processing resources allocated, the user will likely use the assigned resources for the gaming session.

After the user starts playing, the game play of the user is monitored. If it is determined, during monitoring, that the user is not playing at the level for which the processing resources were allocated, then the prediction logic 412 will send a signal to the instant play preload manager 310 to dynamically change the resources for the user so that the processing resources are not over-allocated to the user. Similar signal may also be generated when the prediction logic 412 determines that the processing resources are under-allocated for the gaming session, in one embodiment.

In one example embodiment, the monitoring can be done by determining the data "traffic" on the communication "pipeline" (i.e., communication connection) between the allocated server and the user's computing device used for the game play when testing for quality-of-service (QOS). It should be noted that the QOS testing may be done periodically during game play to determine if the resource allocated is sufficient for the user session. The data traffic is determined by examining, in substantial real-time, the type and amount of game packet data that is being exchanged between the user's computing device and the game cloud system during the current gaming session. Data from the QOS testing is compared against resource prediction to determine if the allocated resources need to be adjusted to provide optimal gaming experience to the user.

The resource prediction, in one embodiment, may be based on prior usage data using gaming history data, such as histogram of the prior use, type of game played, time of day of accessing the cloud gaming system, game level played, etc., of last few game sessions to predict the game play pattern of the user. Usually, when a user logs in, the user is likely to resume a game at a point where the user previously left off (i.e., signed off during their last session). Therefore, there is high likelihood that they will jump back at the same level that they were in before. Likelihood may be determined with a certainty factor that can be measured. The certainty factor can be, e.g., greater than 50, on a scale from 1-100. In some cases, higher certainty factor, e.g., 80 is needed to ensure that the action being predicted is more likely to occur. The prediction logic may also gauge the user's current game play pattern by analyzing the user's prior log-ins and use of game play (i.e., the type of game play the user followed during last 3 days/last week/etc.).

In one embodiment, the predictive analysis data is shared by the prediction logic 412 with the instant play preload manager 310 so as to identify and assign a proper data center that is, (a) closest to the user, and (b) that the identified data center has the predicted processing resources for assigning to the user to allow the user to have a rich game play experience. The predictive analysis provides an additional verification to ensure that a data center to which the user's request is usually or currently routed has the necessary resources to allow the user to have an optimal game play experience without compromising on the quality of such connection.

In one embodiment, once the user is assigned the data center and the game console and begins game play, the bandwidth of data may begin to drop (i.e., the connection speed may start to drop), while the quality of game play remains at a high level. The connection may drop due to any number of reasons, including demand placed on the pipeline, etc. The game pre-loader module 310, in one embodiment, may recognize the mismatch in the quality of service expected and quality of service delivered and may dynamically lower the resolution of the game automatically to address the mismatch. Once the connection speed resumes to the level required, the resolution may be adjusted upward in a seamless manner so that the user has a rich gaming experience without sacrificing the quality of service.

In some embodiments, when the connection quality begins to drop, the cloud gaming server 402 may send commands to the game logic to render certain game assets with lower resolution quality. The game assets that can be lowered in resolution may, in some embodiments, be identified by the game developer as assets that can be reduced in resolution, as they are not central to the game play. This allows the remaining part of the game in which the user is engaged, to be rendered at higher quality. Yet, by reducing the resolution of certain game assets, objects, textures, etc., the overall data throughput can be reduced to compensate for the reduced connection speed without affecting quality of game play.

In some embodiment, the game console assigner module 426 generates and maintains instant play statistics 428 for the different games available at the cloud gaming site to provide status of the different servers and the different game consoles in each data center so that assigning a game console to instantiate a game may be carried out in a fast and efficient manner. The instant play statistics 428 is provided in the form of an instant play log data 428-*a*. An exemplary instant play log is shown in FIG. 3B. The instant play log 428-*a* provides usage statistics of each game, including game identifier, number of instances of each game that is currently spinning at different game consoles in different data centers, number of instances of each game that are currently locked or engaged by users, number of available instances, predicted instance demand at different times, etc. Additionally, the play log data 428-*a* may also provide information related to which game consoles have been used to instantiate certain games and the status of the different game consoles within different game servers in each data center. Information for some of the statistics may be obtained from usage history, historical demand, player history, and other inputs provided to the prediction logic 412 using data from the game consoles. Based on the statistics provided in the instant play log, the game console assigner may determine what action to take in order to keep the number of instances of each game at an optimal level in anticipation of likelihood of use of the game instances. When user interactions at a game are received at the cloud gaming site, an instance of the game that is already pre-loaded may be provided to the users without much delay. Based on the determination, the game console assigner 426 may signal the instant play loader 410 to increase or decrease the instances for each game title. The instant play log 428-*a*, thus, helps in maintaining games that are in reasonable demand, loading more instances of games that are "hot" (i.e., in greater demand), and discarding instances of games that do not have much user demand.

FIG. 4 illustrates an example "hot" distribution graph plotted for different games, based on the usage history obtained by managing the games and game instances. The hot distribution graph may be used to refine the number of instances of certain ones of the games available within the cloud gaming site. For example, the usage demand for different games may vary with time, with demand for certain games surging and ebbing at different times and such variations may be used to manage the games and game instances. The distribution graph illustrated in FIG. 4 may reflect usage demand for a particular time period or over an extended period of time. Data provided in the graph is used to determine which ones of the games have usage history above a pre-defined threshold value, indicated by the dashed line (e.g., identifying 1500 usage demand) and which ones have usage demand below the pre-defined threshold value. In the example shown in FIG. 4, games E, C, A, D and L have usage demand that fall above the pre-defined threshold value and are targeted for retaining, while games G, R, K, S and N fall below the pre-defined threshold value that may be targeted for discarding. In some embodiments, the games that are targeted for discarding may be maintained for a pre-defined period of time to determine if usage demand increases. This might be the case when new games are introduced for which usage history may not be available. After the pre-defined period, if the usage demand does not increase above the pre-defined threshold value, the games that are targeted for discarding may be discarded. The usage demand of the games may be very fluid and fluctuate over time, and such fluctuation may be considered while maintaining an optimal number of instances of different games.

In some embodiments, the usage demand are weighed against capacity and capability of the system resources to ensure that instantiating of one or more games do not adversely affect the performance of the system in providing streaming content to the users, during game play. Accordingly, the system may ensure that the number of dedicated consoles and/or server resources that are provided for instantiating a particular game title does not exceed a pre-defined threshold value. Exceeding the pre-defined threshold value may result in unnecessary system resources being tied down for providing instances that may be seldom used. In order to avoid such performance bottleneck, a subset of the system resource bandwidth may be dedicated for providing game instances of one or more games for sampling while keeping the remaining resources for providing instant play of one or more of the games. When the demand for game play of such games increases at a given period of time, one or more instances from the sampling may be allocated for game play, in some embodiments.

Figure 5:
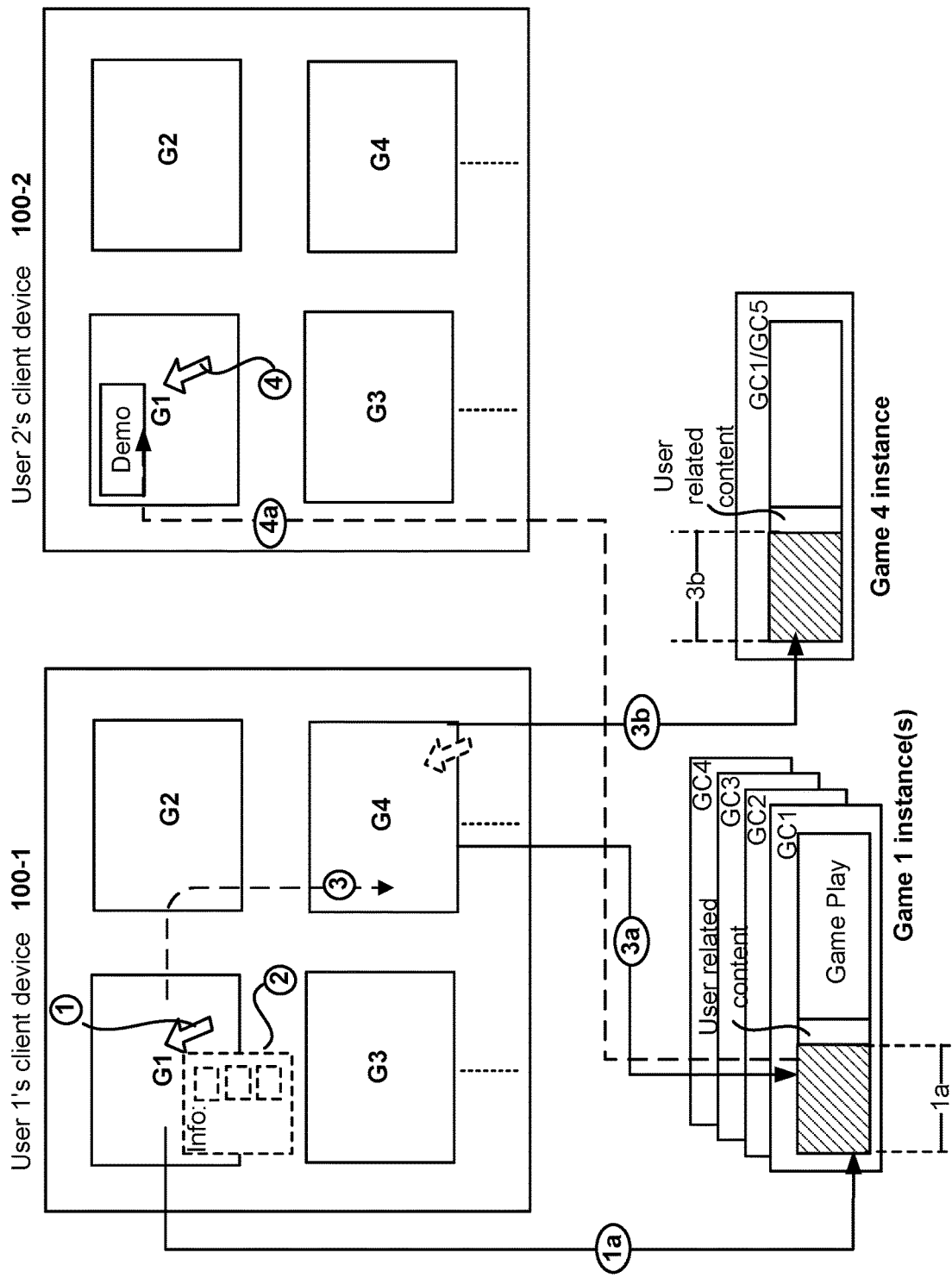
FIG. 5 illustrates the process flow of pre-loading instances of games based on user activities detected at different game titles on the cloud gaming site, in accordance with one embodiment of the present invention.

FIG. 5 illustrates the preloading sequence of different games based on detected user interaction at the respective games on a client device 100, in one embodiment. A user accesses the cloud gaming site using a user account. In response to the user access, the cloud gaming site returns a list of game titles of available games for rendering at a display screen of the client device. The game titles returned to the client device 100 for rendering include a representative image/icon. FIG. 5 illustrates an exemplary set of game titles, G1, G2, G3, G4, etc., that are returned and rendered for users—user 1, user 2. In addition to game titles and image/icons, one or more informative content, such as brief description of the game, representative game scenes, mini clips of pre-recorded game play, one or more additional information options, etc., may also be returned for rendering, in case user interaction is detected at the respective game icon/image.

When user 1's interaction, such as hover activity (represented by bubble '1'), is detected at game G1, the user interaction is monitored to determine amount of time of user interaction (i.e., about 3-5 seconds) at G1. If the amount of time of user interaction is greater than a pre-defined threshold period of time, pre-loading of generic game data for game G1 is initiated at a game server 402, as illustrated by bubble '1a'. Additionally, in response to the user 1's interaction at game G1, one or more of game information, such as game scene, game description, game clip, etc., is automatically selected for rendering in the foreground, as shown by bubble '2,' while in the background, generic game data is pre-loading on to a game console, GC1. The pre-loading of game G1 continues as long as the user 1's interaction is detected at game G1 and the game is not fully pre-loaded. During the pre-loading, if the user 1's interaction shifts from game G1 to game G4, as illustrated by bubble '3', the switch in user interaction is detected at the cloud gaming site 300, which then sends a signal to pause the pre-loading of game G1 at GC1, as illustrated by bubble '3a'. Additionally, as with game G1, the user 1's interaction is monitored to determine if the amount of time of user 1's interaction at G1 exceeds a pre-defined threshold period of time. If the amount of time exceeds the pre-defined threshold period of time, the cloud gaming site 300 sends a signal to a data center to begin pre-loading the game related data of game G4, as illustrated by bubble '3b'. The pre-loading of game G4 may be performed in the background on game console GCS or GC1, depending on one or more assignment criteria associated with the game console, such as the availability of the game console, the bandwidth available at the game console, the system requirements specified in the game code, etc.

When a second user (user 2) accesses the cloud gaming site and provides user interaction at the game G1, as illustrated by bubble '4', the pre-loaded game G1 at GC1 is passed onto user 2, as illustrated by bubble '4a'. If the generic game data for game G1 is fully pre-loaded and the instance is readily available for assignment, there is no need to instantiate a new instance for the game G1 for servicing user 2's request. User 2 is provided with the fully pre-loaded generic game data as demonstration data, based on the user interaction provided by user 2 at game G1. Of course, if the game G1 was partially pre-loaded, the pre-loading is resumed. Upon completion of the pre-loading, if the user interaction of user 2 continues to be passive user interaction at game G1, then the pre-loaded generic game data may be provided as demonstration data. If, on the other hand, the user interaction of user 2 is active user interaction (for e.g., user selection for game play) at game G1, then the game data is provided for instant game play. It should be noted that more than one user may be accessing the cloud gaming site and interacting with one or more game titles at any given time. As a result, a plurality of instances of one game or multiple instances of a plurality of games are instantiated at one or more servers in one or more data centers distributed geographically and assigned to the respective users, in response to the detected user interactions. Once a user is done interacting with a particular instance, the user assignment to the particular instance is removed (i.e., the instance is released). Since each instance of a game is assigned to one user, if the game/game mode is a single-user game/game mode, or to a group of users, if the game/game mode is a multi-user game/game mode, when an instance of the game is released (i.e., is free and available) by the user or the group of users, the available instance of the game may be re-assigned to another user or another group of users, when the other user(s) shows interest in the game. In the multi-user game mode, the users assigned to the instance of the game may be co-located or remotely located. With the detailed description of the various embodiments, a method used for pre-loading games will now be described with reference to FIG. 6.

Figure 6:
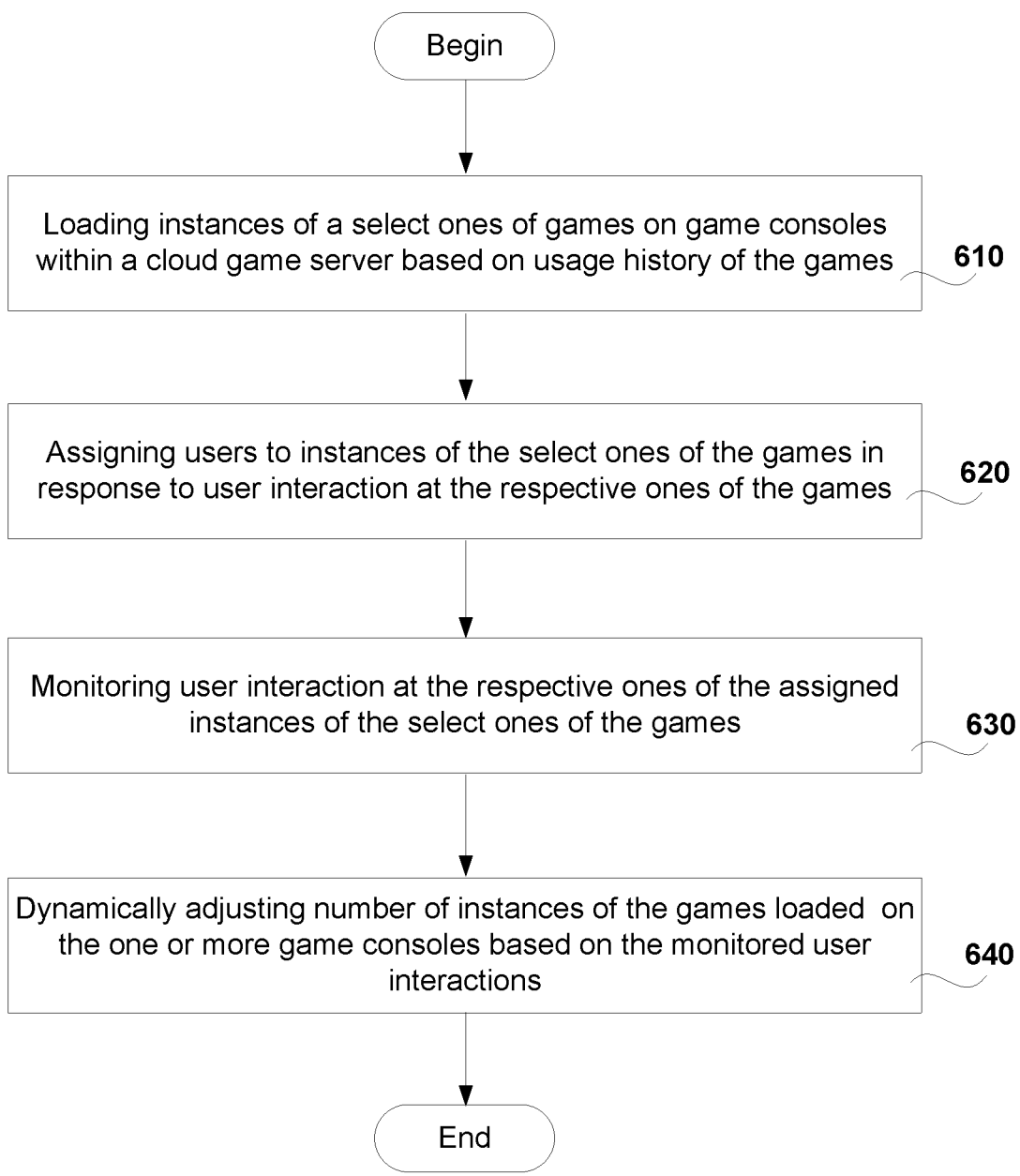
FIG. 6 illustrates process operations involved in pre-loading game instances for providing to a user, in accordance with one embodiment of the present invention.

FIG. 6 illustrates the various method operations for pre-loading games, in response to user interaction detected at a game title, in one embodiment of the invention. The method begins at operation 610 wherein one or more instances of select ones of games are loaded on to one or more game consoles on a cloud game server. The number of instances and the types of games that are loaded are based on usage history of games detected at the cloud gaming site. The usage history may be collected over time identifying the type and number of user interactions at specific ones of the games available at the cloud gaming site. The usage history identifies the usage demand of each game over different periods of time. Users are assigned to instances of select ones of the games loaded on the one or more game consoles, as illustrated in operation 620, when the length of user interactions of respective users at each of the select ones of the games exceeds a pre-defined threshold period.

User interactions are further monitored at the assigned instances of the loaded games, as illustrated in operation 630. The user interactions may be passive user interactions, such as hovering, cursor proximity, etc., or active user interactions, such as user selection of a game for game play or viewing. The number of instances of the games loaded on the one or more game consoles is dynamically adjusted based on the monitored user interaction at the respective ones of the games, as illustrated in operation 640. The dynamic adjustment of the number of instances allows optimal use of game resources on the cloud game server while providing instant access to the game to the users.

Figure 7:
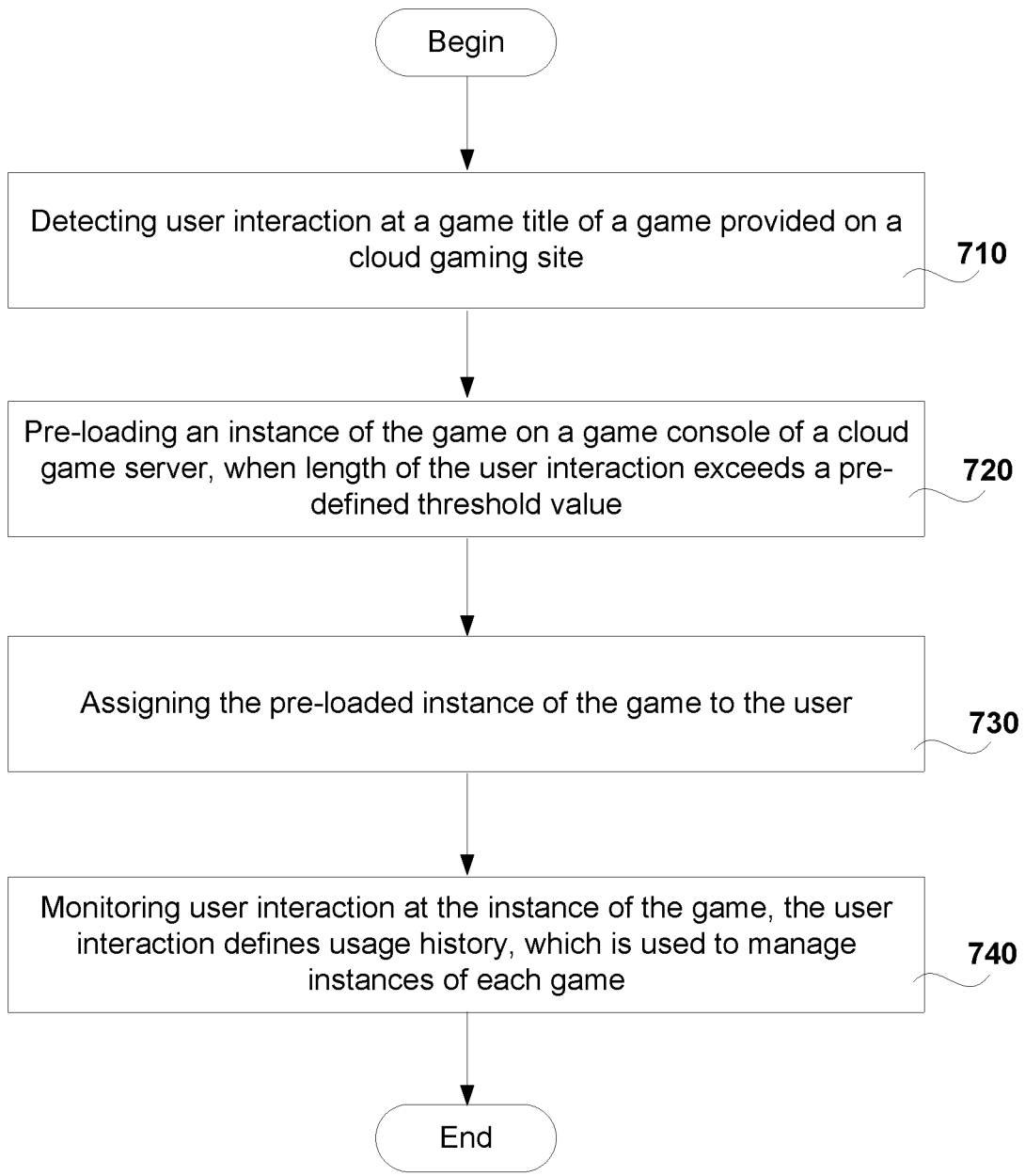
FIG. 7 illustrates process operations involved in pre-loading game instances for providing to a user, in accordance with an alternate embodiment of the present invention.

FIG. 7 illustrates an alternate method used for pre-loading games and making the pre-loaded games available to users, in one embodiment. The method begins at operation 710 when user interaction is detected at a game title of a game available on a cloud gaming site. The cloud gaming site may have a plurality of game titles available to it and a user request to access the cloud gaming site results in the cloud gaming site identifying and returning game titles of games that are available for the user account. When a number of game titles available for the user account is high, only a pre-set number of game titles may be returned for rendering on a client device of the user. The pre-set number of game titles may include games that were recently viewed or played by the user. The returned game titles are rendered on a display screen of the client device. In response to a user interaction detected at one of the game titles rendered on the client device, an instance of the game is pre-loaded on a game console of a cloud game server available to the cloud gaming site, as illustrated in operation 720. The pre-loading of the game is initiated when a length of user interaction detected at the game title exceeds a pre-defined threshold time.

The pre-loaded instance of the game is assigned to the user, in response to the detected user interaction, as illustrated in operation 730. The assigning causes a portion of informative content for the game to be rendered at the display screen of the client device. The method concludes with further monitoring of user interaction at the instance of the game, as illustrated in operation 740. The user interaction at the instance is used to define usage history for the game. The usage history related to game instances of one or more games by a plurality of users is used to predict usage demand for different games at different times and to manage number of instances of the games available to the cloud gaming site.

The various embodiments provide novel ways of pre-loading an instance of a game in the background while game information is provided in the foreground, based on type and length of user interaction detected at the game title. The pre-loading causes substantial reduction in the wait time when access for game play of the game is requested. The pre-loading includes loading the generic game related data of the game, which normally causes the greatest delay when accessing a game for game play or game view. It should be noted that the content of the games available at the cloud gaming site are being streamed to the client device for rendering and is not installed locally within the client device. As such, the data center at which the game is to be instantiated, is selected based on processing and communication resources so that the game related data can be streamed with minimal latency, to enable the user(s) to have an enriching game play experience with minimal wait for accessing the game. Other advantages will become apparent to one skilled in the art upon reviewing the various embodiments of the invention described herein.

In some embodiments, the client can be a general purpose computer, a special purpose computer, a portable gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 8:
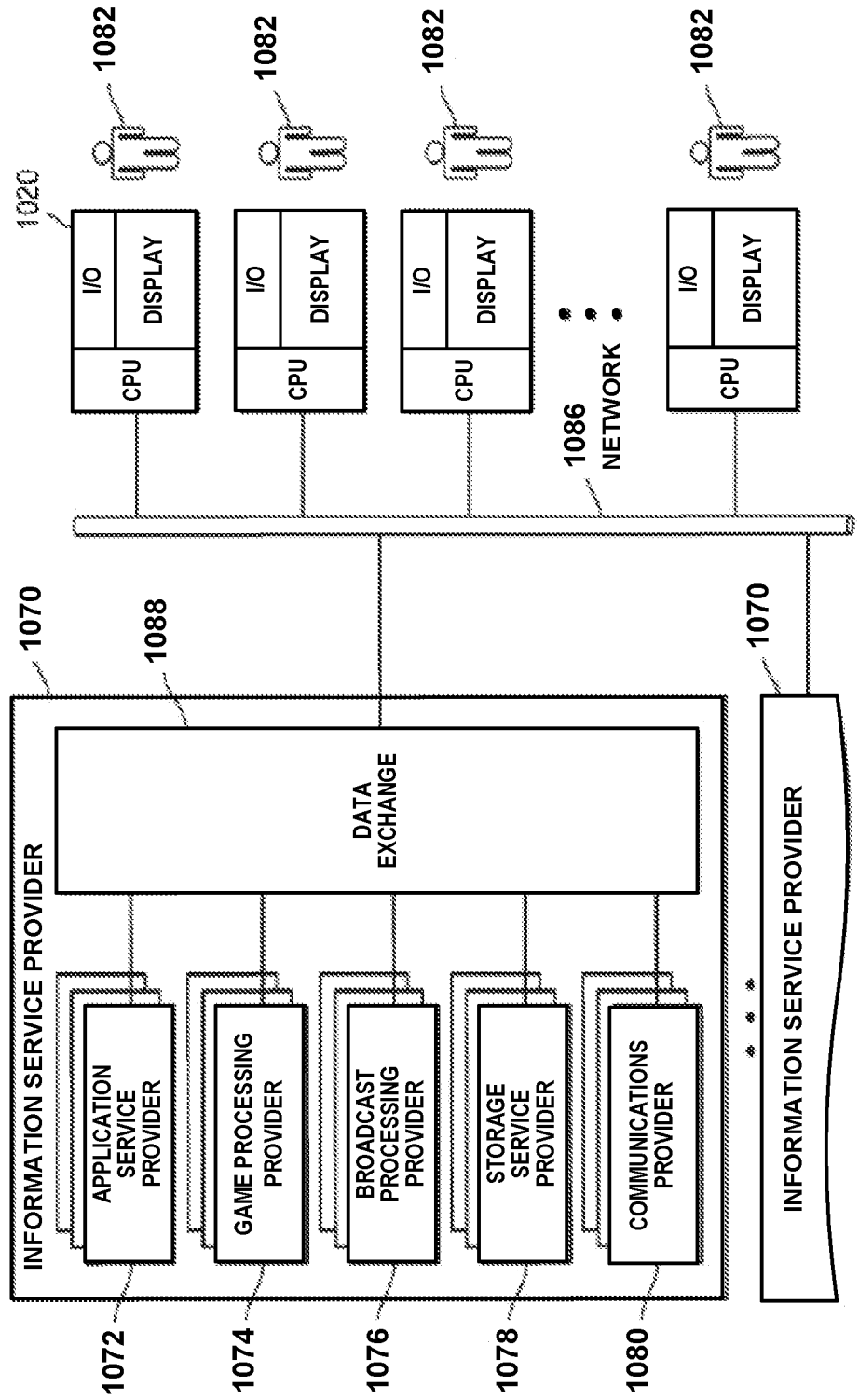
FIG. 8 illustrates an exemplary Information Service Provider architecture for delivering informational content and services to users who are geographically dispersed and connected via network, in accordance with one embodiment of the present invention.

FIG. 8 illustrates an embodiment of an Information Service Provider architecture. Information Service Providers (ISP) 1070 delivers a multitude of information services to users 1082 geographically dispersed and connected via network 1086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 1070 includes Application Service Provider (ASP) 1072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, using special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1070 includes a Game Processing Server (GPS) 1074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independent of where the user is located or the device being used to access the data. For example, a user can access personal files in the home computer, as well as in a mobile phone while the user is on the move.

Communications Provider 1080 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1088 interconnects the several modules inside ISP 1070 and connects these modules to users 1082 via network 1086. Data Exchange 1088 can cover a small area where all the modules of ISP 1070 are in close proximity, or can cover a large geographic area when the different modules are geographically dispersed. For example, Data Exchange 1088 can include a fast Gigabit Ethernet (or faster) within a cabinet of a data center, or an intercontinental virtual area network (VLAN).

Users 1082 access the remote services with client device 1084, which includes at least a CPU, a memory, a display and I/O. The client device can be a PC, a mobile phone, a netbook, tablet, gaming system, a PDA, etc. In one embodiment, ISP 1070 recognizes the type of device used by the client and adjusts the communication method employed. In other cases, client devices use a standard communications method, such as html, to access ISP 1070.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

Figure 9:
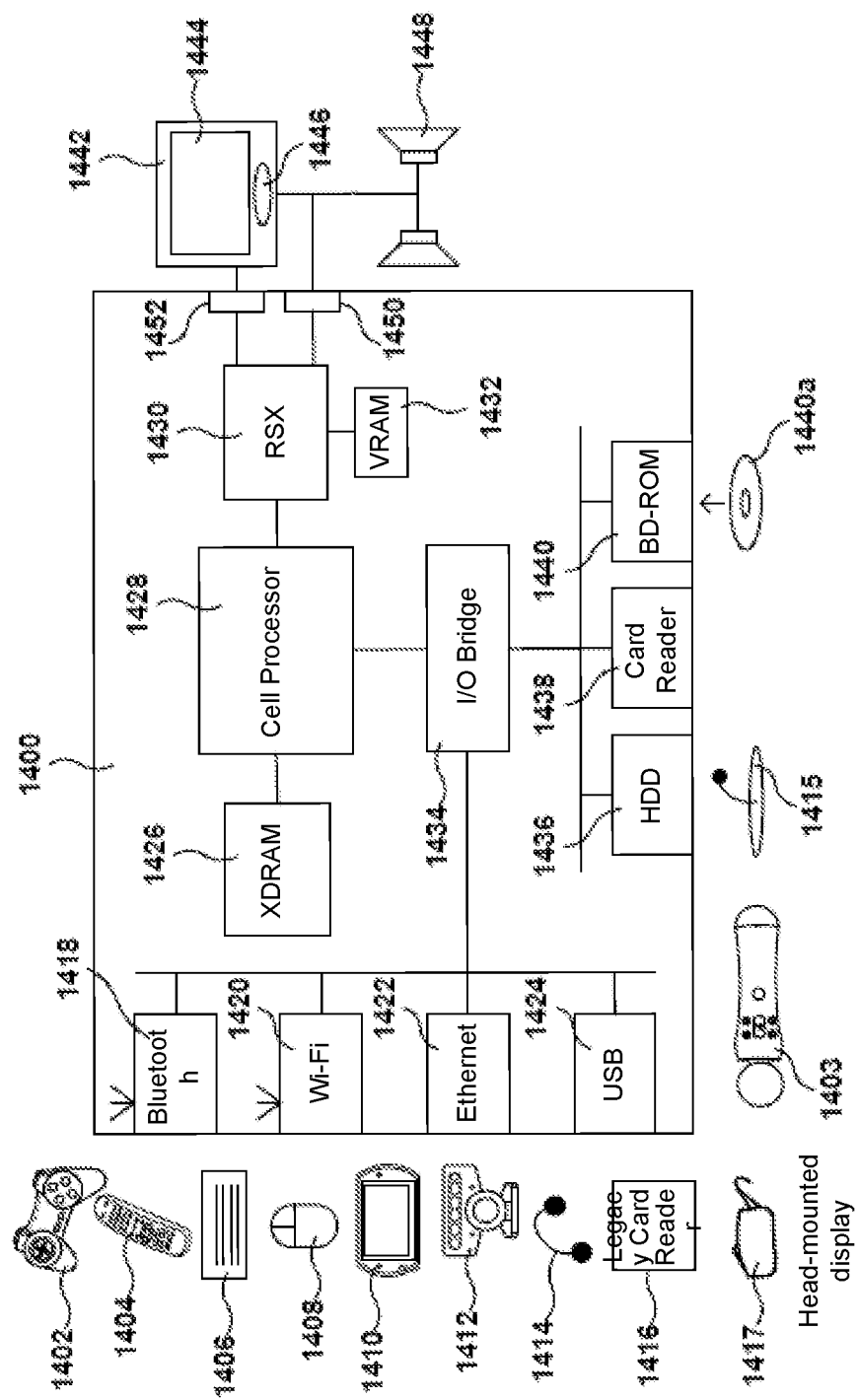
FIG. 9 illustrates exemplary components of a computing device used for controlling content presented to a user, in accordance with one embodiment of the invention.

FIG. 9 schematically illustrates the overall system architecture of a gaming console, such as Sony® Playstation 3® entertainment device, that may be compatible with controllers for implementing an embodiment of the present invention. A system unit 1400 is provided, with various peripheral devices connectable to the system unit 1400. The system unit 1400 is similar to the cloud gaming server 300 of FIG. 2. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu Ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

In operation the I/O bridge 1434 handles all wireless, USB and Ethernet data, including data from one or more game controllers 1402-1403 and HMD 1417. For example when a user is playing a game, the I/O bridge 1434 receives data from the game controller 1402-1403 via a Bluetooth link and directs it to the Cell processor 1428, which updates the current state of the game accordingly.

The wireless, USB and Ethernet ports also provide connectivity for other peripheral devices in addition to game controllers 1402-1403 and HMD 1417, such as: a remote control 1404; a keyboard 1406; a mouse 1408; a portable entertainment device 1410 such as a Sony Playstation Portable® entertainment device; a video camera such as an PlayStation® Eye Camera 1412; and headphones 1414; and a microphone headset 1415. Such peripheral devices may therefore in principle be connected to the system unit 1400 wirelessly; for example the portable entertainment device 1410 may communicate via a Wi-Fi ad-hoc connection, while the headphones 1414 may communicate via a Bluetooth link.

The provision of these interfaces means that the PlayStation 3 device is also potentially compatible with other peripheral devices such as digital video recorders (DVRs), set-top boxes, digital cameras, portable media players, Voice over Internet Protocol (IP) telephones, mobile telephones, printers and scanners.

In addition, a legacy memory card reader 1416 may be connected to the system unit via a USB port 1424, enabling the reading of memory cards of the kind used by the Playstation® or Playstation 2® devices.

The game controllers 1402-1403 are operable to communicate wirelessly with the system unit 1400 via the Bluetooth link, or to be connected to a USB port, thereby also providing power by which to charge the battery of the game controllers 1402-1403. Game controllers 1402-1403 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, an imperfect sphere, a soccer ball, a football or rugby ball, a section of a sphere, a truncated pyramid, a truncated cone, a baseball bat, a truncated cube, a polyhedron, a star, etc., or a combination of two of more of these shapes.

Game controller 1402 is a controller designed to be used with two hands, and game controller 1403 is a single-hand controller with a ball attachment. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1404 is also operable to communicate wirelessly with the system unit 1400 via a Bluetooth link. The remote control 1404 comprises controls suitable for the operation of the Blu Ray™ Disk BD-ROM reader 1440 and for the navigation of disk content.

The Blu Ray™ Disk BD-ROM reader 1440 is operable to read CD-ROMs compatible with the Playstation and PlayStation 2 devices, in addition to conventional pre-recorded and recordable CDs, and so-called Super Audio CDs. The reader 1440 is also operable to read DVD-ROMs compatible with the Playstation 2 and PlayStation 3 devices, in addition to conventional pre-recorded and recordable DVDs. The reader 1440 is further operable to read BD-ROMs compatible with the Playstation 3 device, as well as conventional pre-recorded and recordable Blu-Ray Disks.

The system unit 1400 is operable to supply audio and video, either generated or decoded by the Playstation 3 device via the Reality Synthesizer graphics unit (RSX) 1430, through audio 1450 and video 1452 connectors to a display and sound output device 1442 such as a monitor or television set having a display 1444 and one or more loudspeakers 1446, or stand-alone speakers 1448. In one embodiment, voice and gaze inputs are utilized to play sound toward specific audio speakers according to the Point of Gaze (POG) of the user. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1428. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1412 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1400. The camera LED indicator is arranged to illuminate in response to appropriate control data from the system unit 1400, for example to signify adverse lighting conditions. Embodiments of the video camera 1412 may variously connect to the system unit 1400 via a USB, Bluetooth or Wi-Fi communication port. Embodiments of the video camera may include one or more associated microphones, and is capable of transmitting audio data. In embodiments of the video camera, the CCD may have a resolution suitable for high-definition video capture. In use, images captured by the video camera may for example be incorporated within a game or interpreted as game control inputs. In another embodiment, the camera is an infrared camera suitable for detecting infrared light.

In general, in order for successful data communication to occur with a peripheral device such as a video camera or remote control via one of the communication ports of the system unit 1400, an appropriate piece of software such as a device driver should be provided. Device driver technology is well-known and will not be described in detail here, except to say that the skilled man will be aware that a device driver or similar software interface may be required in the present embodiment described.

Embodiments may include capturing depth data to better identify the real-world user and to direct activity of an avatar or scene. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
   loading instances of a game on one or more game consoles of a cloud game server, the loading of instances for the game is based on usage history available for the game on the cloud game server;
   detecting, by the cloud game server, an amount of time of hovering interaction occurring at a game title of the game presented for selection, the hovering interaction is not a selection action selecting said game for game play;
   assigning users to corresponding instances of said game, when the amount of time of hovering interaction of respective users detected at the game title of the game exceeds a pre-defined threshold value, the assigning done automatically and prior to receiving selection action from the respective ones of the users; and
   dynamically adjusting a number of the instances of the game loaded on the one or more game consoles, based on the instances of the game assigned to the users, the dynamically adjusting includes scaling up or scaling down the number of instances of the game loaded on the one or more game consoles,
   wherein method operations are performed by a processor of the cloud game server.

2. The method of claim 1, wherein when the game loaded on the one or more game consoles is a single user game, assigning users includes assigning each instance of the game to a distinct user; and
   when the game is a multi-user game, assigning users includes assigning an instance of the game to a plurality of users, wherein the plurality of users may be co-located or remotely located and may compete against or collaborate with each other during game play of the game.

3. The method of claim 1, wherein assigning users further includes,
   monitoring status of an instance of the game assigned to a user to determine presence or absence of user engagement at the instance; and
   re-assigning, based on the monitored status, the instance of the game to a second user, when no user engagement is detected from the user assigned to the instance of the game, for a pre-defined period of time.

4. The method of claim 3, wherein monitoring status further includes,
   maintaining an instant play log for the instances of the game available on the cloud game server, the instant play log keeping track of the usage history of the game based on user interactions at the instance of the game, information provided in the instant play log used to manage the number of instances of the game and for re-assigning the one or more of the instances of the game to one or more other users.

5. The method of claim 4, wherein adjusting further includes,
- determining the usage history for the game for a pre-defined period of time using information provided in the instant play log; and
- adjusting the number of instances of the game downward, when the usage history for the game during the pre-defined period of time indicates a demand that is less than the number of instances available for the game by a pre-defined threshold value.

6. The method of claim 4, wherein adjusting further includes,
- predicting usage demand for the game using information provided in the instant play log, wherein the information in the instant play log provides usage history for the game and for other games that are from same genre as the game; and
- adjusting the number of instances of the game based on the usage demand predicted for the game.

7. The method of claim 1, wherein loading instances of the game includes loading generic game related data of the game, and assigning users includes loading user related data of respective users for corresponding instances of the game assigned to the respective users.

8. The method of claim 1, wherein loading further includes,
- determining a pre-defined threshold value for the number of instances of the game that can be instantiated on each game console in the cloud game server; and
- loading the number of instances of the game on each game console in accordance to the pre-defined threshold value and the usage history for the game.

9. A method, comprising:
- loading instances of a game on one or more game consoles of a cloud game server, the loading of instances for the game is based on usage history available for the game on the cloud game server;
- detecting, by the cloud game server, an amount of time of hovering interaction occurring at a game title of the game presented for selection, the hovering interaction is not a selection action selecting said game for game play;
- assigning users to corresponding instances of said game, when the amount of time of hovering interaction of respective users detected at the game title of the game exceeds a pre-defined threshold value, the assigning done automatically and prior to receiving selection action from the respective ones of the users; and
- dynamically adjusting a number of the instances of the game loaded on the one or more game consoles, based on the instances of the game assigned to the users, the dynamically adjusting includes scaling up or scaling down the number of instances of the game loaded on the one or more game consoles,
- wherein loading instances of the game includes loading generic game related data of the game, and assigning users includes loading user related data of respective users for corresponding instances of the game assigned to the respective users, and
- wherein method operations are performed by a processor of the cloud game server.

* * * * *